United States Patent
Khotimsky et al.

(10) Patent No.: US 11,736,840 B2
(45) Date of Patent: *Aug. 22, 2023

(54) SYSTEMS AND METHODS OF OPEN CONTENTION-BASED GRANT ALLOCATIONS

(71) Applicant: Verizon Patent and Licensing Inc., Basking Ridge, NJ (US)

(72) Inventors: Denis A. Khotimsky, Westborough, MA (US); Eugene DeFrancisci, Seaford, NY (US); Gregory K. Sherrill, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/221,861

(22) Filed: Apr. 5, 2021

(65) Prior Publication Data
US 2021/0329356 A1   Oct. 21, 2021

Related U.S. Application Data

(63) Continuation of application No. 16/928,237, filed on Jul. 14, 2020, now Pat. No. 10,986,428.

(60) Provisional application No. 63/010,194, filed on Apr. 15, 2020.

(51) Int. Cl.
*H04Q 11/00*   (2006.01)

(52) U.S. Cl.
CPC . *H04Q 11/0067* (2013.01); *H04Q 2011/0064* (2013.01); *H04Q 2011/0088* (2013.01)

(58) Field of Classification Search
CPC ....... H04Q 11/0067; H04Q 2011/0088; H04Q 2011/0064
See application file for complete search history.

(56) References Cited

U.S. PATENT DOCUMENTS

| | | | | |
|---|---|---|---|---|
| 6,006,271 A | * | 12/1999 | Grabiec | H04L 12/413 370/229 |
| 2003/0039211 A1 | * | 2/2003 | Hvostov | H04L 45/00 370/461 |
| 2010/0239252 A1 | * | 9/2010 | Davis | H04Q 11/0067 398/58 |
| 2011/0142442 A1 | * | 6/2011 | Hirth | H04Q 11/0067 398/25 |
| 2016/0087748 A1 | * | 3/2016 | Khotimsky | H04J 14/025 398/67 |

OTHER PUBLICATIONS

Antonios G. Sarigiannidis , "Architectures and Bandwidth Allocation Schemes for Hybrid Wireless-Optical Networks"—IEEE Communication Surveys & Tutorials, vol. 17, No. 1, Sep. 15, 2014, pp. 430,436,444,447,455-456).*

(Continued)

*Primary Examiner* — Omar S Ismail

(57) ABSTRACT

A method may include transmitting an open contention-based grant to optical network units (ONUs) and receiving, from at least one of the ONUs, a response to the open contention-based grant. The method may also include determining whether a collision has occurred in response to the open contention-based grant. The method may further include provisioning grants to ONUs in response to determine that a collision has occurred.

20 Claims, 8 Drawing Sheets

(56) References Cited

OTHER PUBLICATIONS

Michael P. McGarry, "Ethernet Passive Optical Network Architectures and Dynamic Bandwidth Allocation Algorithms," Sep. 16, 2008, IEEE Communications Surveys & Tutorials (vol. 10, Issue: 3, Third Quarter 2008), pp. 46-56.*

Kun Yang, "Convergence of Ethernet PON and IEEE 802.16 Broadband Access Networks and its QoS-Aware Dynamic Bandwidth Allocation Scheme," Aug. 6, 2008, IEEE Journal on Selected Areas in Communications, vol. 27, No. 2, Feb. 2009, pp. 101-109.*

Jun Zhenga, "A survey of dynamic bandwidth allocation algorithms for Ethernet Passive Optical Networks," Mar. 31, 2009, Optical Switching and Networking 6 (2009), pp. 151-157.*

Sarigiannidis, et al., "Architectures and Bandwidth Allocation Schemes for Hybrid Wireless-Optical Networks", IEEE Communication Surveys & Tutorials, vol. 17, No. 1, Sep. 15, 2014, pp. 430,436,444,447,455-456.

* cited by examiner

SYSTEMS AND METHODS OF OPEN CONTENTION-BASED GRANT ALLOCATIONS

RELATED APPLICATION

This application is a Continuation of U.S. patent application Ser. No. 16/928,237, entitled "Systems and Methods of Open Contention-Based Grant Allocations" and filed Jul. 14, 2020, which claims priority under 35 U.S.C. § 119 based on U.S. Provisional Application 63/010,194 entitled "Systems and Methods of Open Contention-Based Grant Allocation to Increase Effective Upstream Service Capacity in a Passive Optical Network," filed Apr. 15, 2020, the contents of which are both hereby incorporated herein by reference in their entireties.

BACKGROUND

A Passive Optical Network (PON) is an optical access network that is typically based on a point-to-multipoint (P2MP) optical fiber topology, known as an optical distribution network (ODN). An ODN uses fiber and passive components, such as splitters and combiners. A PON system uses the ODN to provide connectivity between a number of central nodes and a number of user nodes using bi-directional wavelength channels. Operation of the PON system in the upstream direction from user nodes to the central nodes typically utilizes principles of Time-Division Multiple Access (TDMA) for each wavelength channel. For example, each user node is granted or allocated an upstream transmission opportunity within a tightly controlled time interval.

In response to a grant of a transmission opportunity, also referred to as an allocation, a user node turns on its optical transmitter, transmits a burst of data along with Operations and Maintenance (O&M) information, and then turns off its transmitter until the next transmission opportunity is granted. The frequency and size of grants to an individual user node is arbitrated by a central node. The central node operates under multiple constraints associated with the individual user node's service rate, delay, and jitter requirements. Increasing the frequency of the transmission opportunities granted to an individual user node allows that user node to transmit upstream bursts more often and improves the delay and jitter performance of that particular user node. However, each transmitted burst from the user node incurs an overhead. Such overhead reduces the overall available upstream data bandwidth in the PON.

DETAILED DESCRIPTION OF PREFERRED EMBODIMENTS

The following detailed description refers to the accompanying drawings. The same reference numbers in different drawings may identify the same or similar elements.

Implementations described herein provide systems and methods for granting upstream transmission opportunities on a contention basis, thus reducing the upstream overhead while meeting the delay and jitter requirements of individual nodes. For example, in one implementation, a broadcast contention-based grant in a PON system, referred to herein as an open upstream transmission grant or open contention-based grant, may be used. The open upstream transmission grant is broadcast and can be utilized by any active pre-ranged optical network unit (ONU). In contrast to conventional unicast directed grants, an open upstream transmission grant may receive a response from multiple ONUs. Further, in contrast to conventional contention-based serial number grants, an open upstream transmission grant does not require a quiet window that is used to avoid collisions. The term "collision" as used herein refers to transmissions from two or more ONUs that overlap in time from the perspective of a receiver device, such as an optical line transmitter channel termination (OLT CT) device, that receives the transmissions. As a result, using open upstream transmission grants may increase system throughput, while also meeting user nodes' service rate, delay and jitter requirements.

Figure 1:
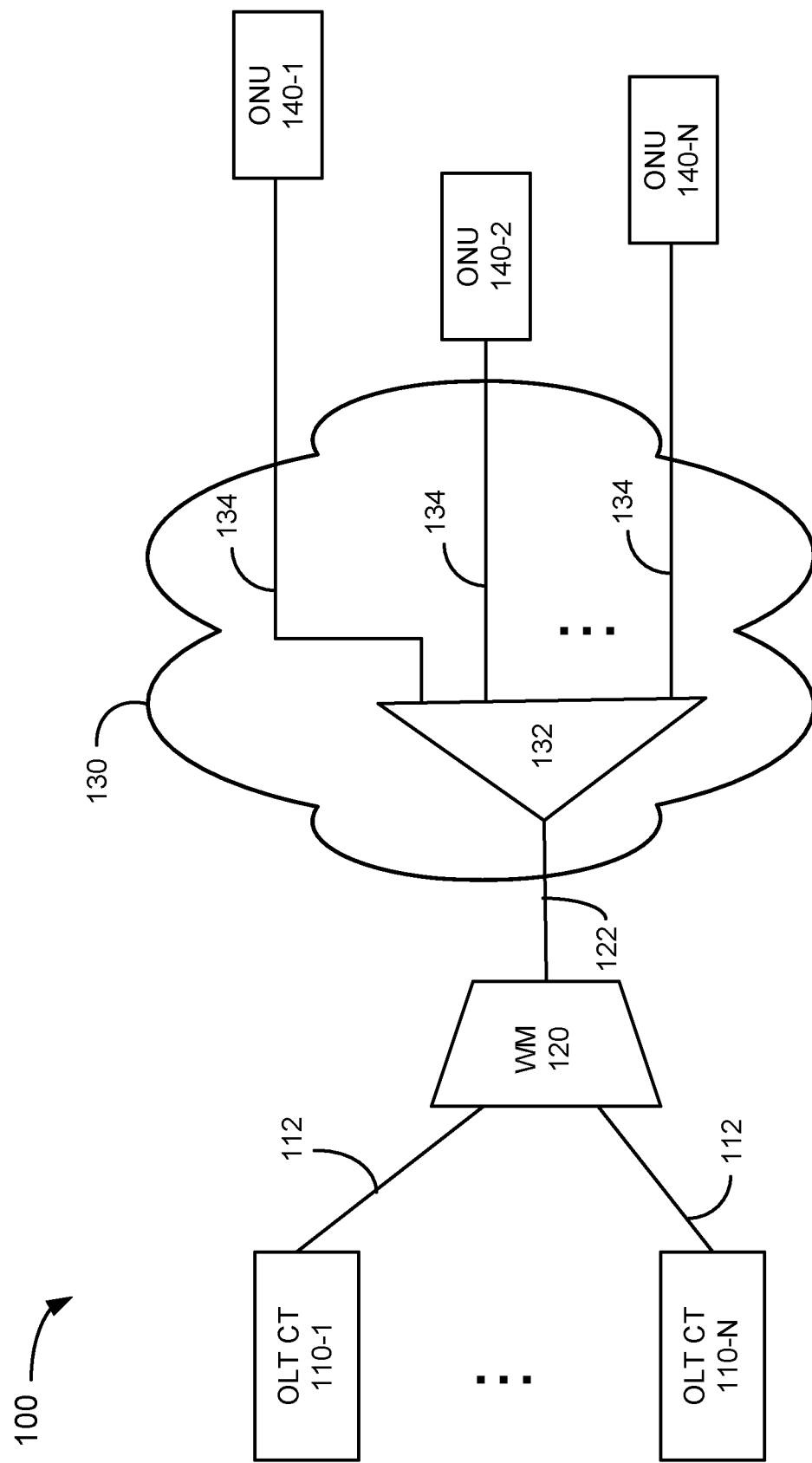
FIG. 1 illustrates an exemplary multi-channel PON system in which systems and methods described herein may be implemented.

FIG. 1 illustrates an exemplary environment 100 in which systems and methods described herein may be implemented. Environment 100 includes a multi-channel time wavelength division multiplexing (TWDM) system that includes a number of optical line terminal channel termination (OLT CT) devices 110-1 through 110-N, wavelength multiplexer (WM) 120, optical distribution network (ODN) 130 and optical network units (ONUs) 140-1 through 140-N.

OLT CT devices 110 (referred to individually as OLT CT 110 or OLT CT 110-x, and collectively as OLT CTs 110) each include an optical device that may perform various functions, such as traffic scheduling, buffer control and bandwidth allocation. In an exemplary implementation, each OLT CT 110 is associated with its own bi-directional wavelength channel having a fixed downstream wavelength and a fixed upstream wavelength. OLTs 110 may be connected to WM 120 via channel drop fibers 112. In an exemplary implementation, OLT CT 110 controls upstream transmissions from ONUs 140 via a Bandwidth Map (BWmap). For example, OLT CT 110 may generate the BWmap based on a number of inputs and transmit the BWmap via WM 120 and PON 130 to ONUs 140, as described in detail below.

ODN 130 includes an optical network that provides an optical transmission medium between, for example, OLT CTs 110 and ONUs 140. For example, ODN 130 may include optical splitter 132 and optical fibers 134. ODN 130 may also include fiber optic connectors, attenuators, modulators and other optical components (not shown). In an exemplary implementation, ODN 130 may include a passive optical distribution network that includes no active components that are used to transmit signals through ODN 130. In other implementations, ODN 140 may include active optical network components, such as optical amplifiers, switches, multiplexers, etc.

ONUs 140 (referred to individually as ONU 140 or ONU 140-x, or collectively as ONUs 140) may each include an optical device that provides network-side line termination and user-side line termination. For example, ONU 140 may perform various functions, such as converting an optical signal to an electrical signal and multiplexing and de-multiplexing. ONU 140 may connect to various end devices or user devices (not shown). For example, the end devices may execute applications and provide users with access to various services, such as television service, telephone service, Internet service and/or other types of services.

In accordance with an exemplary implementation, each ONU 140 may choose a single wavelength channel via which to operate and a single OLT CT 110 as a central node with which ONU 140 will communicate and receive instructions. ONU 140 may also switch wavelength channels, as instructed by the respective OLT CT 110. In addition, and in accordance with an exemplary implementation, an optical transmitter at OLT CT 110 operates in a continuous wave (CW) mode and an optical transmitter at ONUs 140 operates in a burst mode (BM).

The exemplary configuration illustrated in FIG. 1 is provided for clarity. It should be understood that a typical environment may include more or fewer devices than illustrated in FIG. 1. For example, environment 100 may include a large number (e.g., hundreds or more) of ONUs 140, as well as a large number of OLT CTs 110. Environment 100 (e.g., PON 130) may include additional splitters and network devices that aid in routing data in environment 100.

Various operations are described below as being performed by particular components in environment 100. In other implementations, various operations described as being performed by one device may be performed by another device or multiple other devices, and/or various operations described as being performed by multiple devices may be combined and performed by a single device.

Figure 2:
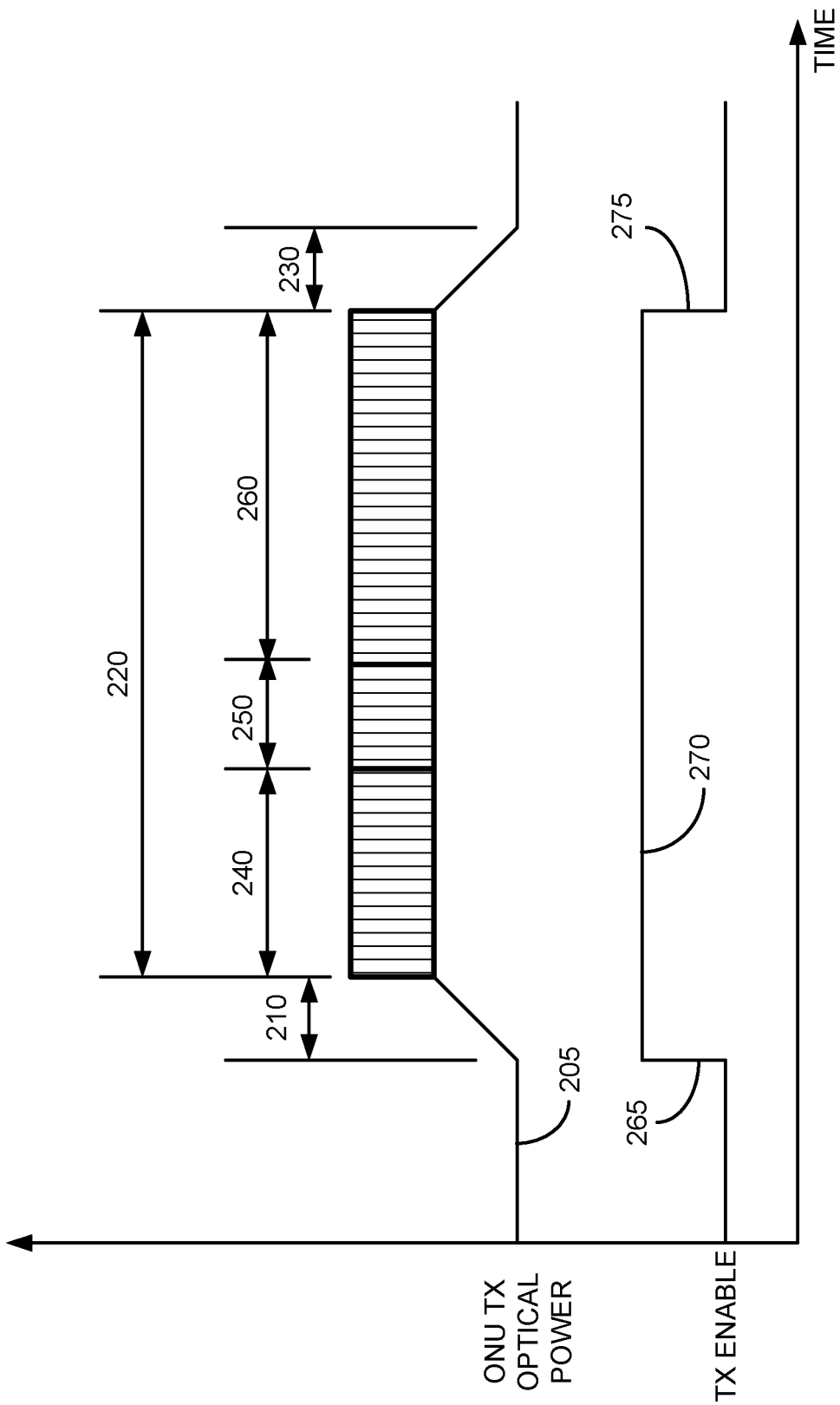
FIG. 2 is a block diagram of a burst transmission in accordance with an exemplary implementation.

As described above, ONUs 140 may operate in burst mode to transmit data. FIG. 2 illustrates an exemplary burst transmitted by an ONU 140. Referring to FIG. 2, burst 220 may include preamble 240, delimiter 250 and data payload 260. Preamble 240 and delimiter 250, along with the guard time that accommodates Enable Transient time 210 and Disable Transient time 230, correspond to physical layer overhead during burst mode operation. The timing of burst 220 may be tightly controlled by the PON TWDM protocol used in environment 100. For example, the optical transmitter at ONU 140 is normally in an OFF state, with the emitted optical power at or close to zero, as illustrated at line 205 in FIG. 2. Once the transmitter at ONU 140 is enabled by the rising edge 265 of Transmit Enable signal 270, the transmitter takes the Enable Transient time 210 to reach the operation state. The transmitter at ONU 140 then transmits burst 220, which may be a modulated optical signal, until the falling edge 275 of Transmit Enable signal 270 causes the transmitter to stop transmitting the burst and to return to the OFF state within the Disable Transient time 230.

As discussed above, the upstream transmission burst 220 may include preamble 240, delimiter 250 and payload 260. Preamble 240 allows the remote end optical receiver at OLT CT 110 to perform clock and data signal amplitude recovery. Delimiter 250 allows the remote end optical receiver at OLT CT 110 to delineate the start of the data transmission. Data payload 260 includes a burst header and burst payload. Burst 220 may be transmitted by ONUs 140 in response to open contention-based grants, as described in detail below. The term "open contention-based grant," or "open upstream grant," as used herein should be construed as a broadcast grant that does not require a quiet window and can be responded to by multiple ONUs 140.

Figure 3:
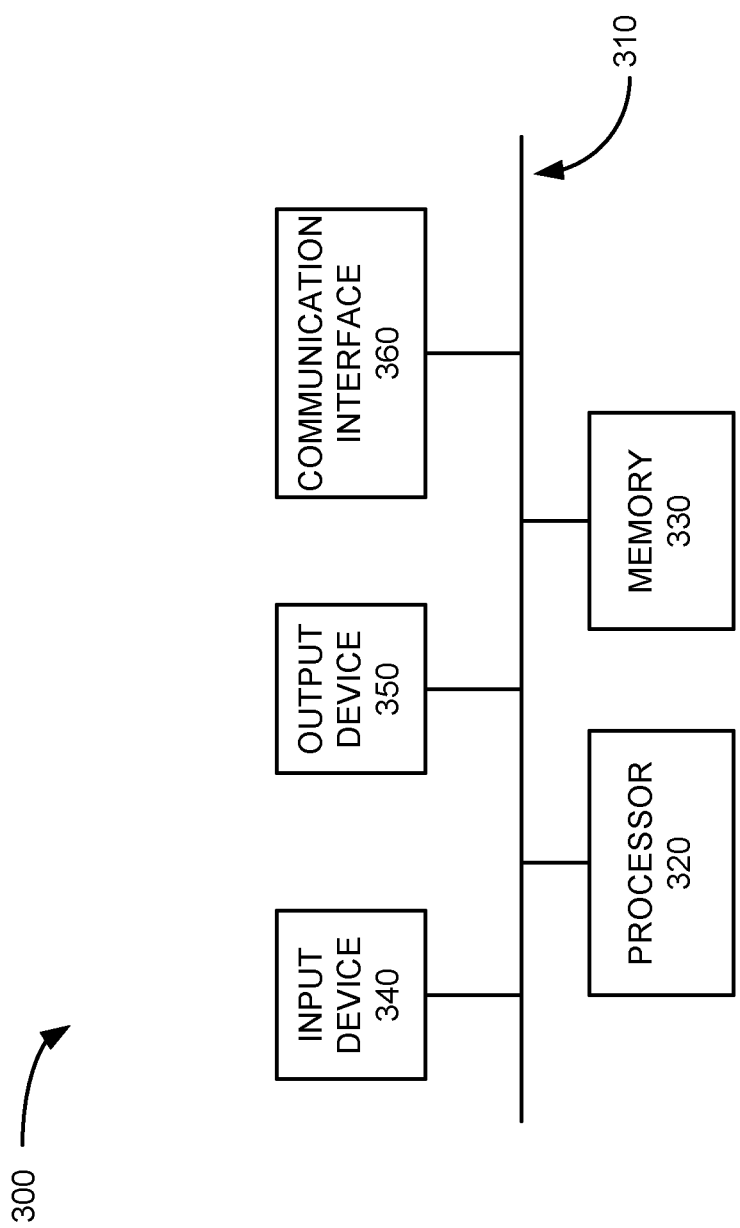
FIG. 3 is a block diagram of components implemented in one or more of the elements illustrated in FIG. 1 in accordance with an exemplary implementation.

FIG. 3 illustrates an exemplary configuration of a device 300. Device 300 may correspond to or include elements implemented in components of environment 100, such as OLT CTs 110, a component of OLT CT 110 (e.g., a bandwidth assignment module/logic, a bandwidth map generation module/logic, etc.), ONUs 140, etc. Referring to FIG. 3, device 300 may include bus 310, processor 320, memory 330, input device 340, output device 350 and communication interface 360. Bus 310 may include a path that permits communication among the elements of device 300.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that device 300 uses to communicate with other devices via wired, wireless or optical mechanisms. For example, communication interface 360 may include one or more optical or radio frequency (RF) transmitters, receivers and/or transceivers and one or more components and/or antennas for transmitting and receiving optical data, RF data, etc. Communication interface 360 may also include a modem or an Ethernet interface to a LAN or other mechanisms for communicating with elements in a network.

The exemplary configuration illustrated in FIG. 3 is provided for simplicity. It should be understood that device 300 may include more or fewer devices than illustrated in FIG. 3. In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), solid state drive (SSD), etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
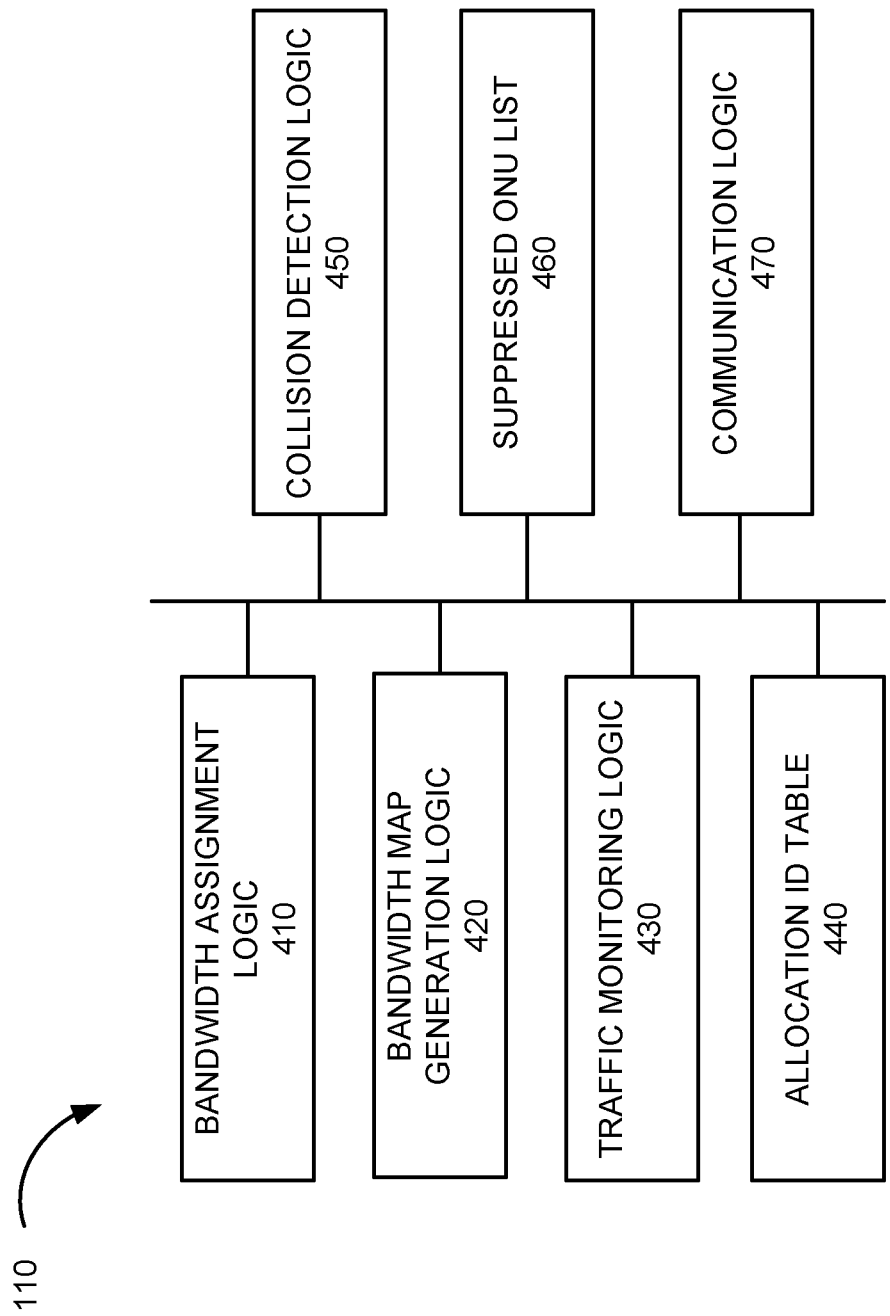
FIG. 4 is a block diagram of components implemented in the optical line terminal channel termination (OLT CT) device of FIG. 1 in accordance with an exemplary implementation.

FIG. 4 is a block diagram of components implemented in OLT CT 110 in accordance with an exemplary implementation. Referring to FIG. 4, OLT CT 110 includes bandwidth assignment logic 410, bandwidth map generation logic 420, traffic monitoring logic 430, allocation identifier (ID) table 440, collision detection logic 450, priority list 460 and communication logic 460. These elements may be implemented by processor 320 executing instructions stored in memory 330 of OLT CT 110. In alternative implementations, these components or a portion of these components may be located externally with respect to OLT CT 110.

Bandwidth assignment logic 410 may include logic to assign bandwidth to ONUs 140. Bandwidth assignment logic 410 may assign bandwidth based on, for example, transmission container (T-CONT) traffic descriptor configured rate parameters for particular ONUs 140, dynamic T-CONT activity/traffic monitoring information, etc. Bandwidth assignment logic 410 may also identify service level agreements (SLAs) associated with particular ONUs 140 to generate bandwidth assignments. In each case, bandwidth assignment logic 410 may generate values of assigned bandwidths for each traffic flow identified by an Allocation ID. Bandwidth assignment logic 410 may generate a set of assigned bandwidths for a certain time period and forward the assigned bandwidths to bandwidth map generation logic 420.

Bandwidth map generation logic 420 may include logic to generate a bandwidth map (BWmap) and transmit the BWmap to ONUs 140. Bandwidth map generation logic 410 may receive inputs, such as T-CONT traffic descriptor configured timing parameters, upstream physical layer Operations, Administration and Maintenance (PLOAM) information/indicators, assigned bandwidths from bandwidth assignment logic 410 to generate BW map. In accordance with an exemplary implementation, bandwidth map generation logic 420 may also receive information indicating whether an open grant collision has been detected and a list of ONUs 140 that are subject to directed grant suppression. Bandwidth map generation logic 420 may use the open grant collision indication and the list of suppressed ONUs 140 when generating BWmaps at regular intervals, as described in detail below.

Traffic monitoring logic 430 may include logic to monitor dynamic T-CONT activity in environment 100 (e.g., on PON 130). For example, traffic monitoring logic 430 may identify overall data traffic/throughput, status information such as whether a particular ONU 140 is receiving adequate bandwidth, etc.

Allocation ID table 440 may store a database of allocation IDs for use in environment 100. In accordance with an exemplary implementation, one or more allocation IDs associated with broadcasting may be reserved to provide for open contention-based allocations that may be used by eligible ONUs 140.

Collision detection logic 450 may include logic to identify when two or more ONUs 140 have transmitted data at the same time or in overlapping time intervals, resulting in a collision. For example, collision detection logic 450 detects collisions in timeslots corresponding to open contention-based grants. As an example, collision detection logic 450 may detect a collision within an open contention-based time slot by monitoring the level of optical power received by OLT CT 110. In this case, collision detection logic 450 may identify whether the receiver at OLT CT 110 fails to recover the clock and data associated with a burst transmission, fails to delineate a burst based on a received deli meter (e.g., delimiter 250), determines an abnormal error level as provided by a hybrid error correction (HEC) indication, bit-interleave parity (BIP) error indication and/or forward error correction (FEC) indication. Collision detection logic 450 may also identify collisions via other mechanisms.

Suppressed ONU list 460 may include a list of ONUs 140 that are subject to directed grant suppression. Such ONUs 460 may be associated with end devices/applications that are not expected to respond to allocations at regular intervals and/or do not need to respond to each allocation. For example, ONUs 140 supporting monitoring applications that are characterized by very low bandwidth requirements, such as intrusion detection applications, medical monitoring, etc., that may not be expected to respond to allocations at regular intervals. However, these applications may have stringent reporting/delay time requirements.

As another example, an ONU 140 may be working on a different channel, but OLT CT 110 may provide a protection channel for that ONU 140. For example, in a multi-wavelength PON system, such as Next generation PON Phase 2 (NG-PON2), a wavelength channel which carries bi-directional user traffic of its own, may be used for protection of the ONUs 140 on another wavelength channel which support mission-critical services (e.g., services that require quick restoration time in case of a protection event, such as service level agreement (SLA)-based business service or wireless transport). In order to meet the restoration time requirements, in one embodiment, an ONU 140 may have an opportunity to transmit a burst within a short time of a protective wavelength switching event that can occur at a random, unpredictable instance. The ONU 140 may be pre-ranged in the protection channel due to consistent ranging methodology. In this case, OLT CT 110 may provide directed grants to each protected ONU 140 at a high frequency, whereas those grants would normally be unused (zero useful data transmitted), with the exception of the occurrence of protective wavelength switching events.

As still another example, an OW 140 may be in a power savings mode for most of the time and execute a standard-based Watchful Sleep protocol and abstain from responding to the directed grants to save power, unless the OLT CT 110 provides a Forced wake-up indication, or a local stimulus event that causes the ONU 140 to resume operation in full power. Once the ONU 140 is placed in the Low Power state, OLT CT 110 may continue to provide regular upstream transmission grants to the ONU 140 to support its ability to wake up on a local stimulus and to indicate its willingness to resume full-power operation. Unless the ONU 140 observes a local wake-up stimulus, these grants remain unused.

ONU list 460 may include a list of such ONUs 140 for which direct grant allocations may be suppressed. That is, such ONUs 140 may not receive any directed grants from OLT CT 110. In accordance with an exemplary implementation, suppressed ONU list 460 may be partitioned into two or more priority sections, such as high priority, average priority and low priority.

Communication logic 470 may include logic for communicating with devices in environment 100. For example, communication logic 470 may include an optical transceiver that transmits and receives optical information to/from PON 130. Communication logic 470 may communicate with WM 120 and other devise in environment 100.

Although FIG. 4 shows exemplary components of OLT CT 110, in other implementations, OLT CT 110 may include fewer components, different components, differently arranged components, or additional components than depicted in FIG. 4.

As described above, implementations described herein provide an open upstream transmission grant that may be broadcast from OLT CT 110 to a number of ONUs 140. The open upstream transmission grant may be utilized by any active pre-ranged ONU 140. In contrast to unicast directed grants, an open upstream transmission grant may receive a response from multiple ONUs 140. In addition, in contrast to contention-based serial number grants, an open upstream transmission grant does not require a quiet window, but rather a regular guard time interval. The OLT CT 110 may utilize the open upstream transmission grant in place of multiple high-frequency directed grants to multiple individual ONUs 140, each of which is unlikely to respond to the grant, thus substantially improving the upstream service capacity.

In an exemplary implementation, the open upstream transmission grants may be identified by the special reserved values of Alloc-ID, which do not coincide with the Alloc-ID values reserved for any other purpose. An ONU 140 which has been activated and ranged may utilize an open upstream transmission grant to communicate signaling or data information to the OLT CT 110. When the OLT CT 110 receives a response to an open upstream transmission grant from a particular ONU 140, OLT CT 110 may restore that ONU 140's directed grants allocated on the individual basis and follow an appropriate signaling and/or data exchange protocol that is being executed.

When OLT CT 110 detects a collision within the time interval which corresponds to an open upstream transmission grant, OLT CT 110 performs one or both of the following: OLT CT 110 increases the frequency of the open upstream transmission grants; OLT CT 110 restores one or more ONUs 140 whose individual directed upstream transmission grants have been suppressed/withdrawn or reduced in frequency in favor of the open upstream contention-based transmission grants.

Figure 5A:
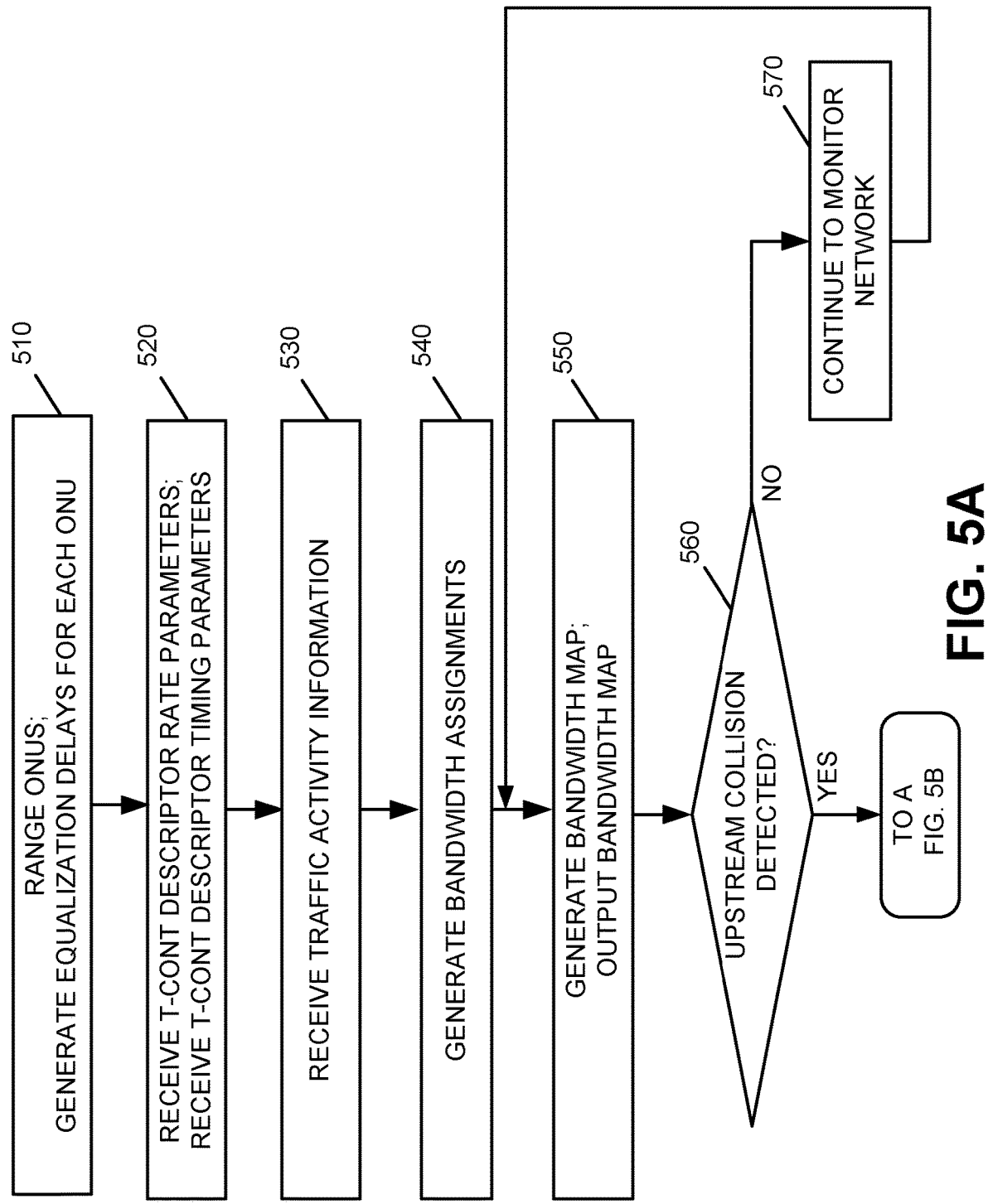
FIGS. 5A and 5B are flow diagrams illustrating processing associated with the environment of FIG. 1 in accordance with an exemplary implementation.
Figure 5B:
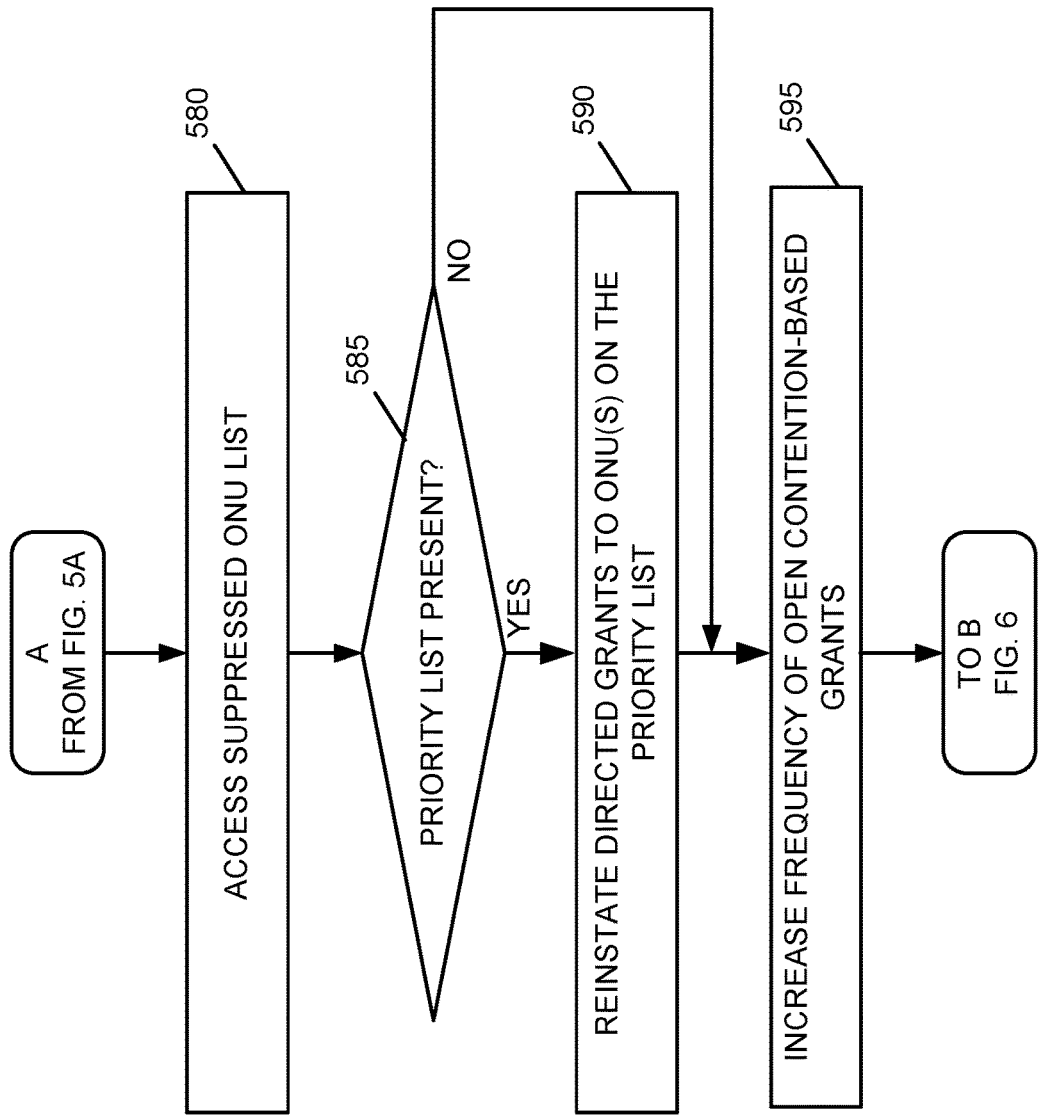

FIGS. 5A and 5B are flow diagrams illustrating processing in accordance with an exemplary implementation. Processing may begin with OLT CT 110 ranging ONUs 140 (FIG. 5A, block 510). For example, during provisioning associated with environment 100, OLT CT 110 may transmit a ranging grant to ONU 140-1 and measure the round-trip time for a data transmission from OLT CT 110 to ONU 140-1 and back to OLT CT 110. OLT CT 110 may then calculate an equalization delay for ONU 140-1 (block 510). The equalization delay is based on the length of the optical fibers (e.g., optical fibers 112, 122 and 134) connecting OLT CT 110 to ONU 140. OLT CT 110 may transmit ranging grants to each ONU and determine the equalization delay for each ONU 140 in a similar manner. Once each ONU 140 has been ranged and an equalization delay has been determined, ONUs 140 may be capable of responding to an open-contention based grant, as described below.

Processing may continue with OLT CT 110 receiving transmission container (T-CONT) descriptor rate parameters (block 520). For example, bandwidth assignment logic 410 may receive T-CONT descriptor rate parameters during provisioning of OLT CT 110 by the service provider associate with environment 100. In an exemplary implementation, the T-CONT descriptor rate parameters may identify a fixed rate, an assured rate and/or a maximum rate. The fixed rate identifies the transmission rate to be provided to ONUs 140 at any time, regardless of whether each ONU 140 has data to transmit. The assured rate identifies the rate at which each ONU 140 will be able to transmit data when ONU 140 has data to transmit. The maximum rate identifies a maximum rate provided to an ONU 140, such as when no other ONUs 140 in environment 100 have data to transmit.

OLT CT 110 may also receive T-CONT descriptor timing parameters (block 520). For example, bandwidth map generation logic 420 may receive T-CONT descriptor timing parameters during service provisioning from the service provider. The timing parameters may include, for example, jitter tolerance/requirements associated with ONUs 140.

OLT CT 110 may also receive dynamic T-CONT activity indications associated with traffic in environment 100 (block 530). For example, traffic monitoring logic 430 may receive traffic load information, traffic status reports, etc., associated with traffic in environment 100. Traffic monitoring logic 430 may forward the traffic information to bandwidth assignment logic 410. OLT CT 110 may also generate bandwidth assignments for ONUs 140 (block 540). For example, based on the received T-CONT descriptor rate parameters and the dynamic traffic activity, bandwidth assignment logic 410 may provide bandwidth assignments for each ONU 140. Bandwidth assignment logic 410 may then forward the bandwidth assignment information to bandwidth map generation logic 420. In accordance with an exemplary implementation, bandwidth assignment logic 410 may forward the bandwidth assignment information at regular intervals (e.g., every millisecond (ms) or some other period).

During initial provisioning of OLT CT 110 or in the course of regular operation, OLT CT 110 may also receive upstream physical layer Operations, Administration and Maintenance (PLOAM) information. For example, the service provider associated with environment 100 may identify the amount of PLOAM information that may be included in data bursts sent from ONUs 140 and provide this information to bandwidth map generation logic 420. OLT CT 110 may also use this information when decoding bursts from ONUs 140.

Bandwidth map generation logic 420 may generate a bandwidth map (BWmap) based on the received information (block 550). For example, bandwidth map generation logic 420 may generate the bandwidth map based on the received bandwidth assignments from bandwidth assignment logic 410, the received T-CONT descriptor timing parameters and the upstream PLOAM information. Bandwidth map generation logic 420 may also use an indication of whether a collision has occurred and the list of suppressed ONUs 140 when generating BWmap, as described in more detail below.

Bandwidth map generation logic 410 may broadcast the BWmap to ONUs 140 (block 550). For example, in accordance with an exemplary implementation, bandwidth map generation logic 410 may broadcast BWmap every predetermined period of time, such as every 125 microseconds (μs). OLT CT 110 may monitor the network in accordance with each BWmap to determine whether an upstream open grant collision is detected (block 560). For example, as discussed above, collision detection logic 450 may determine that the receiver at OLT CT 110 has failed to recover the clock and data associated with a burst transmission, failed to delineate a burst based on a received delimiter 250, determined an abnormal error level as provided by a hybrid error correction (HEC) indication bit-interleave parity (BIP) error indication and/or forward error correction (FEC) indication, etc. Assume that OLT CT 110 receives a response to an open upstream transmission grant from one particular ONU 140 and no collision is detected (block 560—no). That is, OLT CT 110 detected optical power on the particular channel, received the optical transmission via its receiver, and successfully decoded the transmission (e.g., detect the delimiter 250, identified the header information, identified and successfully decoded the payload, etc.). In this case, OLT CT 110 continues to monitor environment 100 and generates the next BWmap at the predetermined time (block 570).

If, however, OLT CT 110 detects a collision within the time interval which corresponds to an open upstream transmission grant (block 560—yes), OLT CT 110 may access suppressed ONU list 460 (FIG. 5B, block 580). As discussed above, suppressed ONU list 460 may include various ONUs 140 that may not be able to or may not need to respond to the bandwidth allocations provided by OLT CT 110. Such reasons may include, for example, ONUs 140 that are primarily devoted to monitoring applications which only need to report an infrequent abnormal event, ONUs 140 being served on a different channel in a multi-wavelength PON system, and are offered wavelength protection by the given channel, ONUs 140 that are executing a standard-based power saving protocol and abstain from responding to the grants to conserve power, etc.

OLT CT 110 may also determine if a priority list or priority information is present in suppressed ONU list 460 (block 585). For example, suppressed ONU list 460 may include priority information associated with ONUs 140 for which directed grants have been suppressed. The priority information may include a relative priority, such high priority, medium priority, low priority.

If a priority list/information is present (block 585—yes), OLT CT 110 may restore or reinstate one or more ONUs 140 whose individual regular directed upstream transmission grants have been suppressed or reduced in frequency (block 590). Additionally, or alternatively, OLT CT 110 may increase the frequency of the open contention-based upstream transmission grants (block 595). If no priority list/information is present (block 585—no), OLT CT 110 may increase the frequency of the open contention-based upstream transmission grants (block 595). In this manner, when a collision occurs, OLT CT 110 may take actions to ensure that ONUs 140 having information to transmit will be able to effectively transmit the information via additional open-contention based grants and/or dedicated grants.

In some implementations, if suppressed ONU list 460 does not include priority information, OLT CT 110 may restore directed grants to all ONUs on suppressed ONU list 460. In each case, after the previously suppressed ONUs 140 and ONUs 140 which transmitted data that resulted in collisions have been given the opportunity, such as a period of time to transmit data via directed grants and/or the increased frequency of the open-contention based grants, OLT CT 110 may determine if the collision has been cleared.

Figure 6:
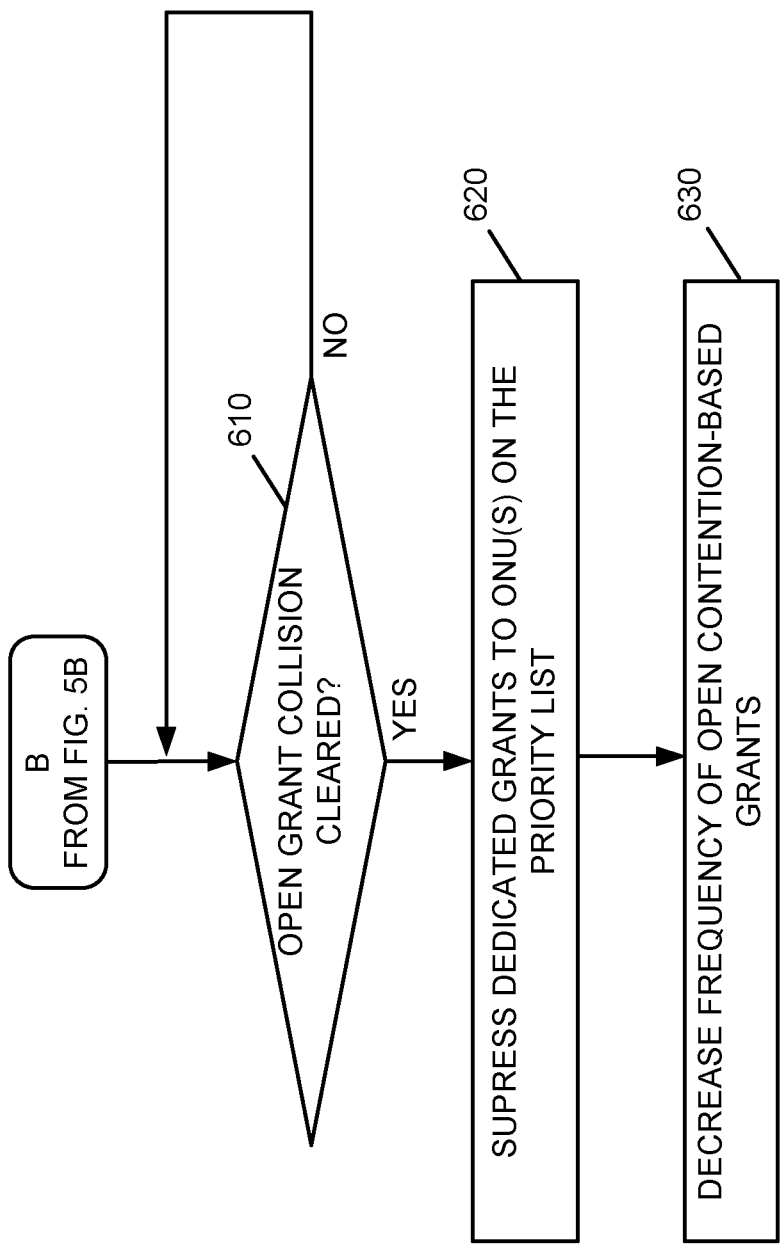
FIG. 6 is a flow diagram illustrating processing associated with a cleared collision in accordance with an exemplary implementation.

FIG. 6 illustrates exemplary processing associated with cleared collisions. Processing may begin with OLT CT 110 determining if the open grant collision has been cleared (block 610). For example, collision detection logic 450 may determine whether any collision is currently detected. If an open grant collision has not been cleared (i.e., a current collision is detected) (block 610—no), OLT CT 110 may continue to operate with directed grants to ONUs 140 on the suppressed ONU list 460 and/or increased frequency of open contention-based grants.

If, however, the open grant collision has been cleared (block 610—yes), OLT CT 110 may suppress directed grants to ONUs 140 on the suppressed ONU list 460 having the appropriate priority (block 620). Alternatively, OLT CT 110 may suppress directed grants to all ONUs 140 on the suppressed ONU list 460. Additionally or alternatively, OLT CT 110 may also decrease the frequency of open contention-based grants to a normal level (e.g., the frequency prior to detection of the collision) (block 630). In this manner, once an open-contention based collision has been cleared, OLT CT 110 may generate and transmit BWmaps that allow each ONU 140 to transmit data, while increasing data throughput.

Figure 7:
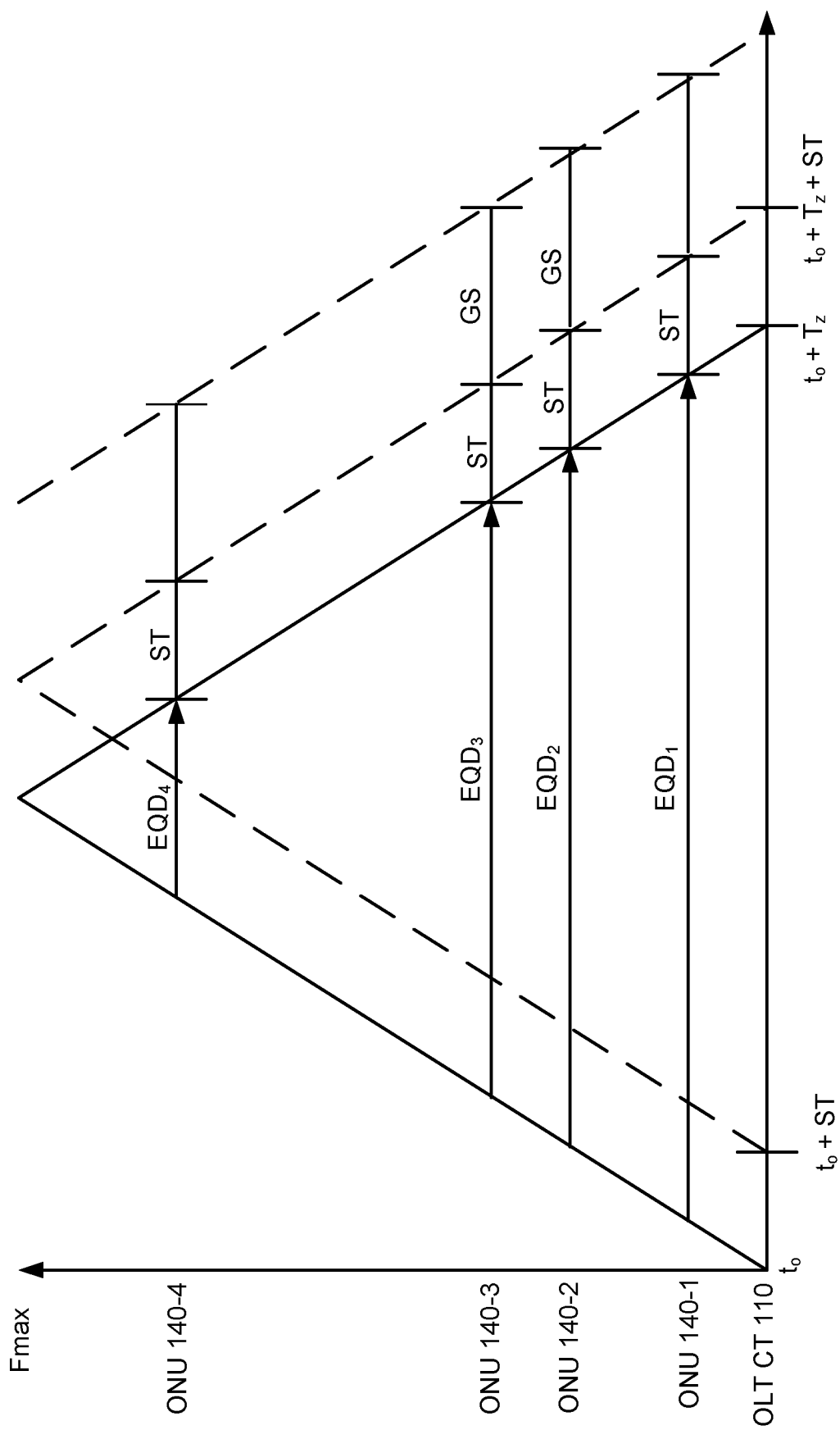
FIG. 7 is an exemplary timing diagram associated with the use of an open contention-based grant in accordance with an exemplary implementation.

As discussed above, open contention-based grants may allow ONUs 140 to transmit data without requiring a quiet window. FIG. 7 illustrates an open contention-based grant in accordance with an exemplary implementation. As described previously, open contention-based grants may be addressed to ranged ONUs 140 for which an equalization delay (EQD) have been assigned.

Referring to FIG. 7, the broadcast open contention-based grant is specified by the Start Time (ST) and the Grant Size (GS). Upon receiving the BWmap from OLT CT 110, any ONU 140 which is the member of the specified recipient set (e.g., ONUs 140-1, 140-2, 140-3 and 140-4 in this example) may respond to the grant with a delay ST+EqDx, where x corresponds to any integer associated with ONUs 140-1 through 140-N. OLT CT 110 expects a response to a broadcast open contention-based grant to start arriving at time $t_0+T_z+ST_X$. As discussed above, a collision between two or more ONU 140 responses is possible, if two or more members of the ONU 140 recipient set, such as ONU 140-2 and 140-3 in this example, choose to respond to the same grant. In such cases, the processing described above will be performed to resolve the collisions and maintain data throughput.

Implementations described herein provide open contention-based upstream grants to ONUs 140 without requiring a quiet window. This may allow ONUs 140 to utilize open upstream transmission grant, as opposed to using multiple high-frequency directed grants to multiple individual ONUs 140. In situations in which particular ONUs 140 are unlikely to respond to directed grants, the use of open contention-based grants substantially improves the upstream service capacity. In addition, as state-of-the-art PON systems evolve towards new advanced applications with large number of users with widely ranging heterogeneous service requirements in terms of data rate, latency, jitter, and quality of service (QoS) guarantees, using open contention-based grants allows the PON system to increase overall capacity and meet the users' service requirements.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to OLT CT 110 providing BWmaps based on particular input and at predetermined times. In other implementations, other devices in environment 100 may be used to provide BWmap information.

Further, in some implementations, in order to optimize the average collision resolution time, once an ONU 140 uses an open contention-based grant, that ONU 140 may be configured to skip responding to a predetermined or random number of future open contention-based grants or skip responding to future open contention-based grants for a period of time. In addition, in some implementations, if an ONU 140 receives a directed grant, that ONU 140 may be configured to not respond to a predetermined or random number of future open contention-based grants or not be eligible to respond to open contention-based grants for a period of time.

Still further, while series of acts have been described with respect to FIGS. 5A, 5B and 6, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, from at least one of a plurality of optical network units (ONUs), a response to an open contention-based grant;
   determining whether a collision has occurred in response to the open contention-based grant; and
   provisioning grants to ONUs in response to determining that a collision has occurred, wherein the provisioning comprises at least one of:
      increasing a frequency of open-contention based grants for a period of time after the collision occurred, or
      providing directed grants to selected ONUs for the period of time after the collision occurred.

2. The method of claim 1, wherein the provisioning grants comprises:
   increasing the frequency of open-contention based grants for the period of time after the collision occurred.

3. The method of claim 1, wherein the provisioning grants comprises:
   providing directed grants to selected ONUs for the period of time.

4. The method of claim 1, wherein the provisioning grants comprises:
   providing directed grants to the selected ONUs based on types of devices coupled to the ONUs or applications executed by the devices coupled to the ONUs.

5. The method of claim 4, wherein the providing directed grants further comprises:
   providing directed grants to the selected ONUs based on an amount of bandwidth the devices or applications are expected to use.

6. The method of claim 1, wherein the provisioning grants comprises providing directed grants to the selected ONUs, and wherein the providing directed grants comprises:
   identifying a priority associated with at least some of the ONUs, and
   providing the directed grants to the at least some of the ONUs based on the priority.

7. The method of claim 1, further comprising:
   determining that the collision has occurred;
   determining whether the collision has been cleared; and
   at least one of:
      decreasing a frequency of open-contention based grants for future periods of time in response to determined that the collision has been cleared, or
      suppressing directed grants to selected ONUs in response to the determining that the collision has been cleared.

8. The method of claim 1, further comprising:
   generating a bandwidth map, wherein the bandwidth map is based on whether a collision has occurred and a list of ONUs for which directed grants have been suppressed.

9. The method of claim 8, further comprising:
   generating the bandwidth map every predetermined period of time; and
   outputting the bandwidth map every predetermined period of time.

10. A device, comprising:
    at least one processor configured to:
    receive, from at least one of a plurality of optical network units (ONUs), a response to the open contention-based grant;
    determine whether a collision has occurred in response to the open contention-based grant; and
    provision grants to ONUs in response to determining that a collision has occurred wherein when provisioning, the at least one processor is configured to at least one of:
       increase a frequency of open-contention based grants for a period of time after the collision occurred, or
       provide directed grants to selected ONUs for the period of time after the collision occurred.

11. The device of claim 10, wherein the provisioning grants causes the at least one processor to:
    increase the frequency of open-contention based grants for the period of time after the collision occurred.

12. The device of claim 10, wherein the provisioning grants causes the at least one processor to:
    increase the frequency of open contention-based grants for the period of time, and
    provide directed grants to selected ONUs for the period of time.

13. The device of claim 10, wherein the provisioning grants causes the at least one processor to:
    provide directed grants to selected ONUs based on a priority associated with the selected ONUs, wherein the selected ONUs include ONUs whose directed grants have been suppressed.

14. The device of claim 10, wherein the provisioning grants causes the at least one processor to:
    provide directed grants to selected ONUs based on types of services provided to end devices coupled to the ONUs or applications executed by the end devices coupled to the ONUs.

15. The device of claim 10, wherein the at least one processor is further configured to:
    determine that a collision has occurred,
    determine whether the collision has been cleared, and
    at least one of:

decrease a frequency of open-contention based grants for future periods of time after the collision has been cleared, or suppress directed grants to selected ONUs in response to determining that the collision has been cleared.

16. The device of claim 10, wherein the at least one processor is further configured to:

generate a bandwidth map, wherein the bandwidth map is based on whether a collision has occurred and a list of ONUs for which directed grants have been suppressed, generate the bandwidth map every predetermined period of time, and broadcast the bandwidth map every predetermined period of time.

17. The device of claim 10, wherein the device comprises an optical line terminal channel termination device.

18. A non-transitory computer-readable medium having stored thereon sequences of instructions which, when executed by at least one processor, cause the at least one processor to:

receive, from at least one of a plurality of optical network units (ONUs), a response to an open contention-based grant;

determine whether a collision has occurred in response to the open contention-based grant; and at least one of:

increase a frequency of open contention-based grants in response to determining that a collision has occurred, or provide directed grants to selected ONUs based on priority information associated with the selected ONUs in response to determining that a collision has occurred.

19. The non-transitory computer-readable medium of claim 18, wherein the instructions further cause the at least one processor to:

increase the frequency of open-contention based grants for a period of time after the collision occurred.

20. The non-transitory computer-readable medium of claim 18, wherein the instructions further cause the at least one processor to:

provide directed grants to the selected ONUs based on the priority information associated with the selected ONUs.

* * * * *